United States Patent [19]
Hanff et al.

[11] 3,913,407
[45] Oct. 21, 1975

[54] DEVICE FOR ACOUSTIC DETECTION IN A NUCLEAR REACTOR

[75] Inventors: Michel Hanff, Bailly; Noël Lions, Manosqur; Jean Peronnet, Aix-en-Provence, all of France

[73] Assignee: Commissariat a l'Energie Atomique, Paris, France

[22] Filed: July 18, 1972

[21] Appl. No.: 272,879

[30] Foreign Application Priority Data
July 22, 1971 France .............................. 71.26817

[52] U.S. Cl. ............................... 73/552; 176/19 R
[51] Int. Cl. .............................................. G01h 3/00
[58] Field of Search .................... 73/69, 71.2, 552; 176/19 R; 181/.5 NP, .5 AP

[56] References Cited
UNITED STATES PATENTS
3,240,674  3/1966  Ledwidge .......................... 176/19 R FOREIGN PATENTS OR APPLICATIONS
1,085,619  7/1954  France ............................... 73/71.2

OTHER PUBLICATIONS
B. Woodward et al., Some Aspects of Boiling Noise Detection in Sodium Reactors by Means of a Mechanical Waveguide Ultrasonics, Jan. 1971, pp. 21–25, s1343–0022.

Primary Examiner—Richard C. Queisser
Assistant Examiner—John P. Beauchamp
Attorney, Agent, or Firm—Cameron, Kerkam, Sutton, Stowell & Stowell

[57] ABSTRACT

The device comprises a first acoustic conductor placed vertically within the coolant liquid contained in a nuclear reactor vessel and a second coaxial acoustic conductor extending to the exterior of the reactor vessel. The device essentially comprises an accelerometer assembly for detecting signals delivered by the second conductor and an amplifier which applies the detected signals to measuring instruments located outside the reactor vessel. The accelerometer comprises an amplifying pressure needle carried by the upper end of the second conductor, a piezoelectric ceramic element, a block fitted with a spring for applying the ceramic element against the needle and a preamplifier connected in series with the amplifier.

4 Claims, 7 Drawing Figures

DEVICE FOR ACOUSTIC DETECTION IN A NUCLEAR REACTOR

This invention relates to a device for the acoustic detection of local boiling of a nuclear reactor coolant and to a method of calibration of said device. However, it should be noted from the outset that the applications of this acoustic detector are not limited to the detection of acoustic phenomena which accompany the boiling process. It is also possible to detect cavitations, abnormal vibrations and any sound-wave emission phenomenon within the limits of sensitivity and of bandwidth of the apparatus.

The appearance of hot spots on fuel elements constituting a reactor core as a result of local reduction in flow rate within a group of said elements is liable to initiate a boiling process in the reactor coolant liquid. Detection of this type of incident must be carried out as soon as possible since it may result within a period of a few seconds in either partial or total melt-down of one or a number of the fuel elements concerned. Detection of the acoustic noise caused by abrupt recondensation of vapor bubbles in the flow can accordingly constitute a means for providing rapid warning of this type of incident.

This invention relates to an industrial device for detecting the phenomenon aforesaid which can readily be applied to a liquid-coolant reactor and in particular although not exclusively to a sodium-cooled reactor.

In accordance with the invention, the acoustic detection device which is designed in particular for detecting local boiling or any phenomenon involving emission of sound waves and ultrasonic waves in a nuclear reactor cooled by a circulating liquid and comprises a first acoustic conductor constituted by a tube having an open lower end and placed vertically in the liquid within the reactor vessel and a second acoustic conductor constituted by a solid rod extending to the exterior of the reactor vessel and mounted in the axis of the tube essentially comprises an accelerometer assembly which detects the signals delivered by the second conductor, and an amplifier which applies the detected signals to measuring instruments located outside the reactor vessel, the accelerometer assembly aforesaid being provided with an amplifying pressure needle carried by the upper extremity of the second conductor, a piezoelectric ceramic element, a block fitted with a spring for applying the ceramic element against the needle and a preamplifier connected in series with the amplifier.

As an advantageous feature, the amplifying needle is surrounded by a travel-limiting ring carried by the lower portion of the accelerator.

In accordance with another preferred arrangement, the second acoustic conductor is cooled by a circulation of gaseous fluid.

The invention also relates to a method for calibrating the detection device, wherein said method essentially consists in measuring, as a function of an emission frequency, the variation in the ratio of the voltage collected at the output of the receiving chain to an acoustic pressure having a constant amplitude and applied to the second acoustic conductor within the fluid in the form of trains or sine-waves.

In accordance with a preferred mode of application, the calibration is carried out in water at ambient temperature, the sine-wave trains being emitted in the water by an emitting hydrophone.

Adjustment of the voltge to be applied to the emitter in order to maintain the amplitude of the acoustic pressure at a constant value can advantageously be determined by means of a preliminary test performed with a standard hydrophone mounted in place of the second acoustic conductor and connected to an identical receiving chain.

A clearer understanding of the invention will in any case be gained from the complementary description which now follows in connection with a particular embodiment of a device according to the invention and the method of calibrating said device which are given by way of indication without any implied limitation, reference being made to the accompanying drawings, wherein.

Figure 1:
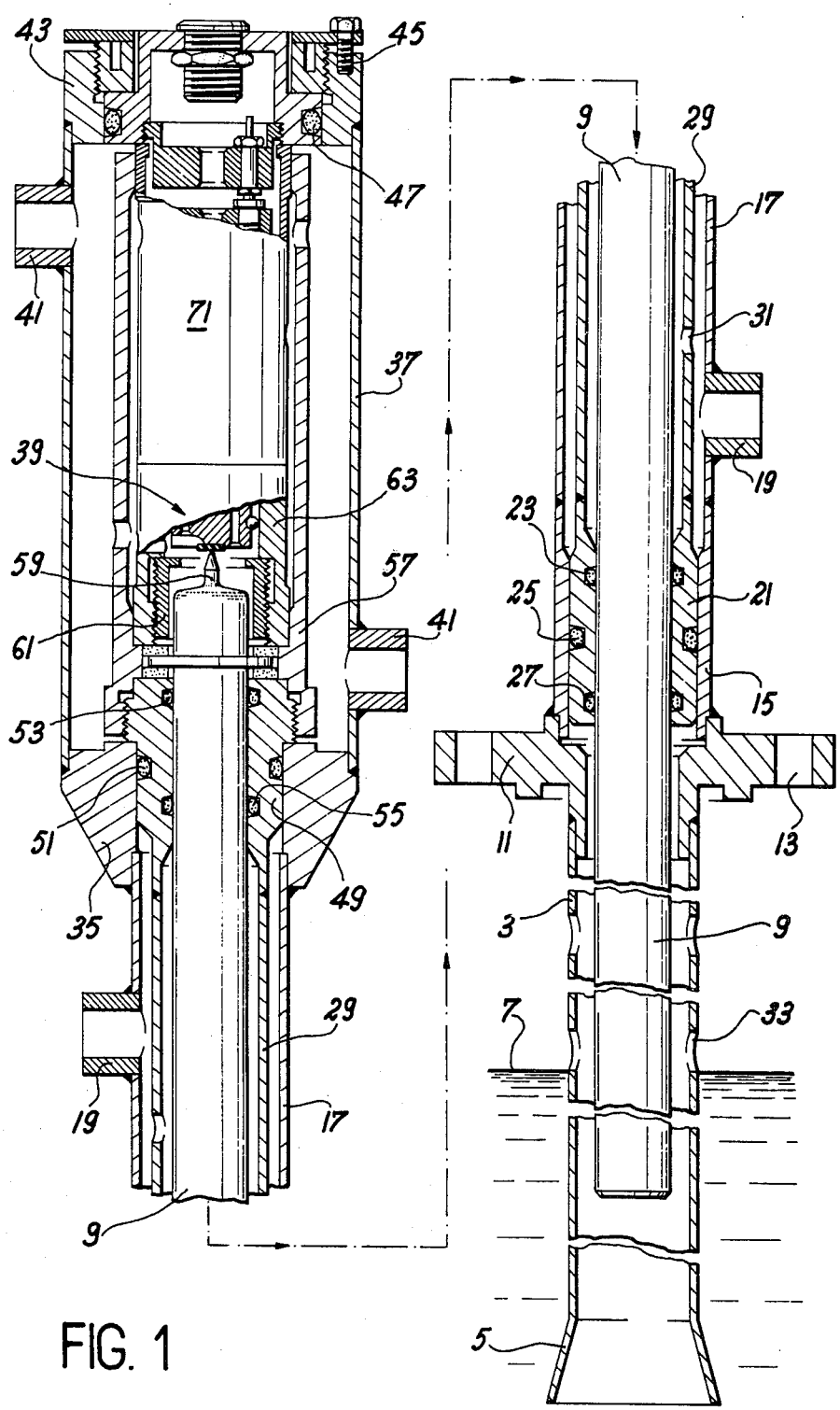
FIG. 1 is a vertical sectional view of a detection device according to the invention.

It is known that local boiling of a liquid causes delivery of an acoustic signal generated by the implosion of vapor bubbles in a random time-distribution. This signal is therefore a noise and must be treated in accordance with the methods of noise analysis. This essential requirement is further justified by the complex behavior of the first acoustic conductor in the form of an open tube which is employed in the detector according to the invention. In fact, the conductor just mentioned has a large number of longitudinal and transverse modes of vibration which travel at different velocities. At the outlet of the acoustic conductor, this phenomenon results in spreading of the signal in time, which corresponds to a distribution of energy between a large number of pulses. The acoustic noise is therefore wholly defined by a knowledge of the mean power contained therein and of the distribution of this power along the axis of frequencies.

The only method which leads to determination of the characteristics of a noise, within a range of frequencies of the phenomenon between 0 kc/s and 500 kc/s, is the utilization of the correlation function. This correlation function is fact offers the advantage of providing in a single measurement and in real time, on the one hand the mean power of the signal by means of the value of the zero-delay autocorrelation function, on the other hand the spectral power density by means of the Fourier transform of the autocorrelation function.

This treatment can be applied only to the output signals of the detector. In point of fact, the characteristics of interest are those of the acoustic noise produced by boiling prior to filtering which is necessarily carried out by the detector itself. Should it prove impossible to obtain the transfer function of the detector with a minimum degree of accuracy, it is possible to perform a relative measurement on the acoustic noise by employing the properties of the correlation function.

In fact, assuming for the sake of simplicity that the detector is a linear filter, we have the following relation between the spectral densities $\phi_{yy}(\nu)$ and $\phi_{xx}(\nu)$ of the signals $y(t)$ at the output of the detector and $x(t)$ at the input:

$$\phi_{yy}(\nu) = \phi_{xx}(\nu) \cdot [G(\nu)]^2 \quad (1)$$

where $G(\nu)$ is the transfer function of the detector and $\nu$ is the frequency.

If the sides of the equation produced bear the index 0 in the case of the background noise of the reactor and the index 1 in the case of the boiling noise, we have the relations:

$$\phi_{y_0 y_0}(\nu) = \phi_{x_0 x_0}(\nu) \cdot [G(\nu)]^2 \quad (2)$$
$$\phi_{y_1 y_1}(\nu) = \phi_{x_1 x_1}(\nu) \cdot [G(\nu)]^2 \quad (3)$$

The ratio of relations (2) and (3) then permits elimination of the transfer function of the detector. In fact, we have:

$$\frac{\phi_{y_1 y_1}(\nu)}{\phi_{y_0 y_0}(\nu)} = \frac{\phi_{x_1 x_1}(\nu)}{\phi_{x_0 x_0}(\nu)} \quad (4)$$

If $$\phi_{y_1 y_1}(\nu) > \phi_{y_0 y_0}(\nu) \quad (5)$$

the ratio of spectral densities of the output signals of the detector before and after boiling therefore represents the spectral power density of the boiling acoustic signals with respect to the acoustic background noise.

In the most general case in which the acoustic background noise can be considered as stationary, this method makes the measurements comparative by eliminating the influence of variations in the transfer function of the detector.

Figure 2:
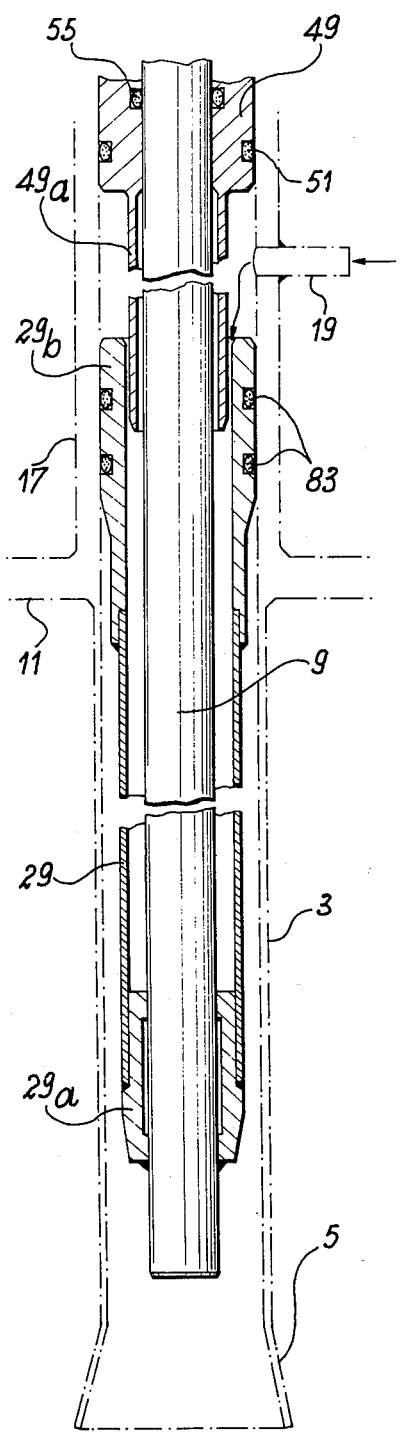
FIG. 2 is a detail view of an alternative form of FIG. 1.

The detection device according to the invention applies the known method of measurement which has just been described. As shown in FIG. 1, the device comprises a first acoustic conductor 3 constituted by a tube having an open lower end and flared at 5. Said tube has a diameter of the order of 30 to 35 mm and is immersed to a depth of 30 centimeters, for example, in the sodium contained in the reactor vessel (not shown), the level of which is indicated at 7. This first acoustic conductor 3 produces longitudinal action for a second acoustic conductor 9 which is provided in the form of a solid rod having a diameter of 20 mm, said second conductor being also immersed in the sodium and intended to transmit acoustic information to the exterior of the reactor vessel. The total length of said rod 9 can be of the order of 1 meter to approximately 10 meters. The tube 3 is rigidly fixed to an annular flange 11 provided with holes 13 for maintaining the complete apparatus above the level 7. The annular flange 11 is in turn secured to a bottom ring 15 having an extension in the form of an outer sleeve 17 provided with inlets 19 for a neutral gas such as argon or air for cooling these components. Provision is made between the bottom ring 15 and the rod 9 for a bushing 21 fitted with seals 23, 25 and 27 which ensure leak-tightness of the assembly, said bushing 21 being integral with an inner sleeve 29 provided with holes 31 through which the gaseous cooling fluid is permitted to flow. The lower portion of the rod 9 penetrates into the interior of the tube 3 which is provided with holes 33 at this level. However, in the case of detectors of very substantial length, it is useful to place around the second acoustic conductor 9 an outer tube containing gas which insulates the conductor from the sodium in order to limit acoustic losses. To this end and as shown in FIG. 2, the inner sleeve 29 can be extended downwards and welded to the lower portion of the rod 9 by means of a member 29a. Said inner sleeve 29 is rigidly fixed at the upper end thereof to an annular portion 29b which is capable of sliding with respect to an extension 49a of a bushing 49, the function of which will be defined hereinafter. Seals such as 83 ensure leak-tightness of the assembly so that, after filling with a neutral gas such as argon, the inner sleeve 29 is permitted to slide under the action of expansion stresses which may take place, for example, during a temperature rise within the reactor vessel.

As shown in FIG. 1, the outer sleeve 17 is rigidly fixed at the upper portion thereof to a top ring 35 and this latter is also rigidly fixed to the outer casing 37 of the accelerometer 39 which will be described below. In order to carry out any cooling which may be necessary, the casing 37 is provided with air inlets such as 41 which are similar to the air inlets 19. A cover 43 fitted with various fixing and sealing means such as screws 45 and the seal 47 closes the top portion of the device.

Provision is made within the top ring 35 for a bushing 49 in which leak-tightness with the top ring 35 is provided by the seal 51 and with the rod 9 by seals 53 and 55. The bushing 49 is rigidly fixed at the lower end thereof to the inner sleeve 29 which surrounds the rod 9. At the top portion thereof, the bushing 49 is screwed into the lower end of a cylinder 57 which contains the accelerometer 39. As shown in FIG. 1, the upper end of the rod 9 carries a machined needle 59 surrounded by a travel-limiting ring 61 which is screwed into the lower portion of the accelerometer body 63. The needle 59 amplifies the pressure of the rod 9 and transmits the acoustic information to the accelerometer assembly 39 with which said needle cooperates. Both the needle and the conductors 3 and 9 can be made of any material having a high modulus of elasticity such as steel whether stainless or otherwise, aluminum bronze, beryllium and the like. In the case of high-temperature applications and especially in reactors of this type in which temperatures of 800° to 1000°C are attained, the material employed can be alumina, tungsten, graphite, molybdenum, niobium, tantalum or tungsten.

Figure 4:
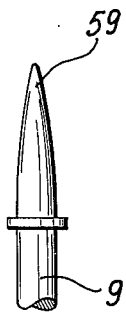
FIGS. 4 to 6 are views illustrating different alternative designs of the amplifying needle.
Figure 5:
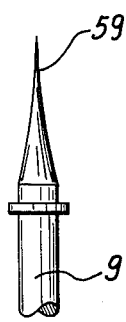
Figure 6:
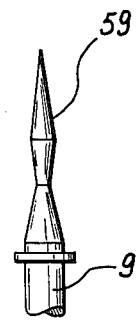
Figure 3:
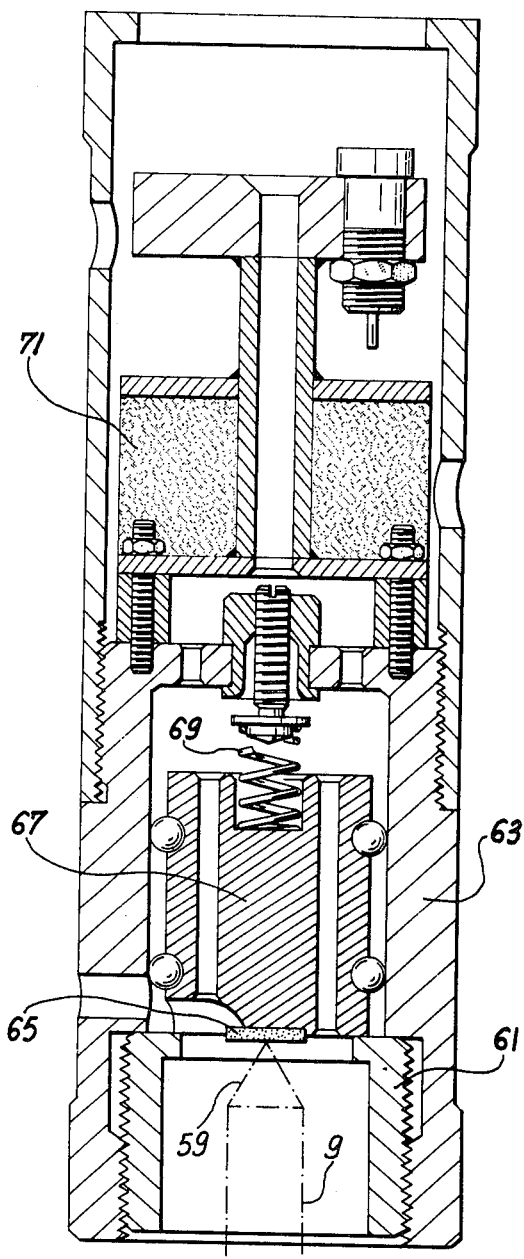
FIG. 3 is a detail view in vertical section showing the accelerometer of the device of FIG. 1.

Moreover and in accordance with a number of alternative embodiments illustrated in FIGS. 4 to 6, the amplifying needle can be formed with different profiles other than the cylindro-conical profile shown in FIG. 3. A parabolic profile is employed in particular in FIG. 4, the focus of the paraboloid being located very near the tip, thereby resulting in highly concentrated point-focusing of the transmitted longitudinal and transverse waves. In FIG. 5, the needle has an exponential profile whereas in FIG. 6, this profile is tri-conic, the angles of the cones being chosen so as to carry the longitudinal and transverse waves produced by reflections from the needle tip.

Finally, as shown in FIG. 3, provision is made within the accelerometer body 63 which carries the travel-limiting ring 61 for a piezoelectric ceramic element 65, a block 67 with a bearing spring 69 which ensures decoupling between the active portion and the rod 9 and finally a preamplifier 71 which is placed as close as possible to the ceramic element in order to limit disturbances and the part played by the capacitance of the connecting cable. The detection chain is completed by an amplifier (not shown) which has the intended function of providing the detected signals with the amplitude which is necessary for controlling measuring instruments (also omitted from the drawings).

Figure 7:
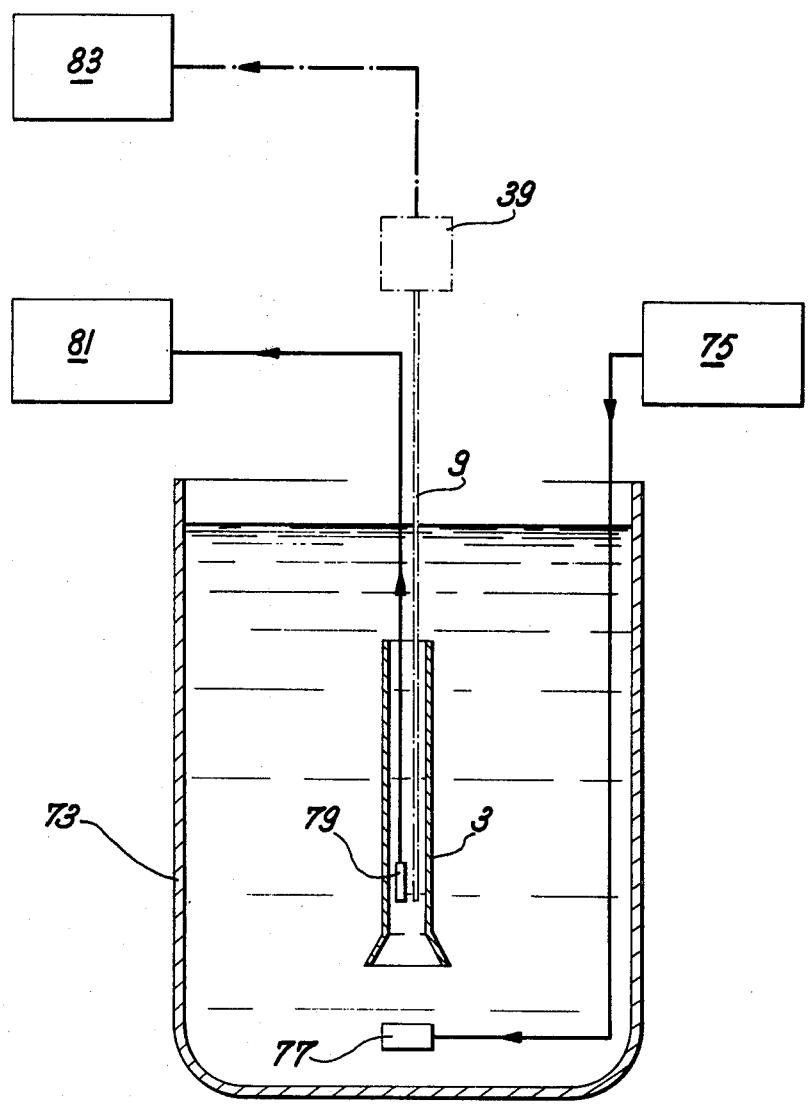
FIG. 7 is a diagrammatic view of a system which is intended to be employed for calibrating the device of FIG. 1.

Reference being made to FIG. 7, there will now be described the method of calibration of the device of FIGS. 1 to 3 which also forms part of the invention.

Calibration of the detection unit is carried out in water at ambient temperature. The device comprises, within a tank 73 filled with water, the tube 3, the rod 9 and the accelerometer assembly 39 which form the device according to the invention. An emitter 75 is connected to an emitting hydrophone 77 which is placed at the bottom of the tank 73. A standard hydrophone 79 can be mounted in place of the rod 9 and connected to the receiver 81. The accelerometer assembly 39 is connected to another receiver 83.

By means of this measuring device, use is made of a simple but approximate method which, by reason of the very closely related acoustic impedances of water and sodium (which are close in value to $1.5 \times 10^6$ kg/m²s), has the advantage of providing an order of magnitude of the mean acoustic sensitivity of the detector in sodium.

A measurement is taken, as a function of the frequency, of the variation in the ratio of the voltage collected at the output of the receiving chain, that is to say at the receiver 83, to the acoustic pressure of constant amplitude applied to the rod 9 in the form of sine-wave trains which are delivered by the emitter 75. Adjustment of the voltage to be applied to the emitter 75 in order to maintain the amplitude of said acoustic pressure at a constant value within the frequency band is determined by a preliminary test with the standard hydrophone 79 which is positioned in place of the rod 9 and connected to the receiving chain 81 which is identical with the receiving chain 83.

The pass-band of the device which corresponds to the limits of sensitivity given hereinafter ranges from 1 kc/s to 500 kc/s. The intrinsic sensitivity under acoustic pressure is within the range of 0.5 $\mu$ V/barye and 10 $\mu$ V/barye. The resonance of the device can be selected within the pass-band. The acoustic-pressure detection threshold, defined as a function of the natural background noise of the electronic circuitry of the device, is of the order of 10 baryes.

As is clearly apparent and as has in any case been brought out by the foregoing, this invention is not limited in any sense to the exemplified embodiment or to the mode of application which has been more particularly described with reference to the accompanying drawings but extends, on the contrary, to all alternative forms.

What we claim is:

1. A device for acoustic detection within the vessel of a nuclear reactor which is cooled by a circulating liquid, comprising a first acoustic conductor constituted by a tube having an open lower end and placed vertically in the liquid within the reactor vessel, a second acoustic conductor constituted by a solid rod extending to the exterior of the reactor vessel and mounted in the axis of the tube, an accelerometer assembly which detects the signals delivered by the second conductor, said accelerometer assembly including an amplifying pressure needle carried by the upper extremity of the second conductor, a piezoelectric ceramic element, a block fitted with a spring for applying said ceramic element against said needle, a preamplifier connected to said ceramic element and a travel-limiting ring carried by the lower portion of the accelerometer surrounding said amplifying needle.

2. A detection device according to claim 1 including means for cooling the second acoustic conductor by a circulation of gaseous fluid.

3. A detection device according to claim 2, said means for cooling including an annular space delimited between the second conductor and a coaxial sleeve rigidly fixed at the lower end thereof to said second conductor receiving the circulation of gaseous fluid.

4. A detection device according to claim 1, wherein the amplifying needle has a profile selected from the group consisting of a cylindro-conical, parabolic, triconic and exponential profile.

* * * * *